G. WILLMAN.
POULTRY FEEDING DEVICE.
APPLICATION FILED APR. 11, 1921.

1,409,434.

Patented Mar. 14, 1922.
2 SHEETS—SHEET 1.

Inventor
GUST WILLMAN

By
C. H. Farber, Attorney

G. WILLMAN.
POULTRY FEEDING DEVICE.
APPLICATION FILED APR. 11, 1921.
1,409,434. Patented Mar. 14, 1922.
2 SHEETS—SHEET 2.
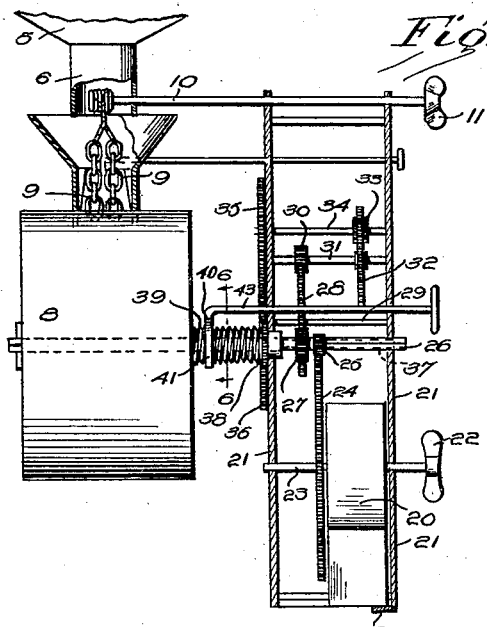
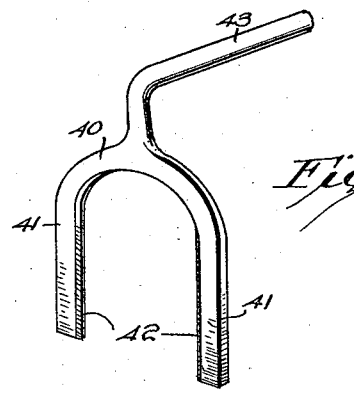
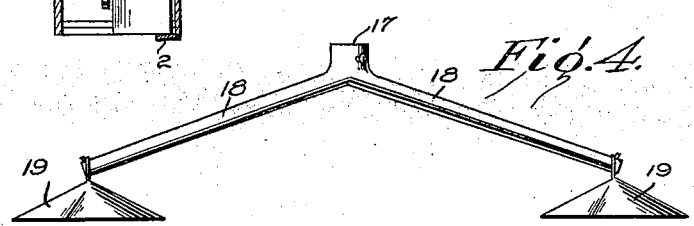
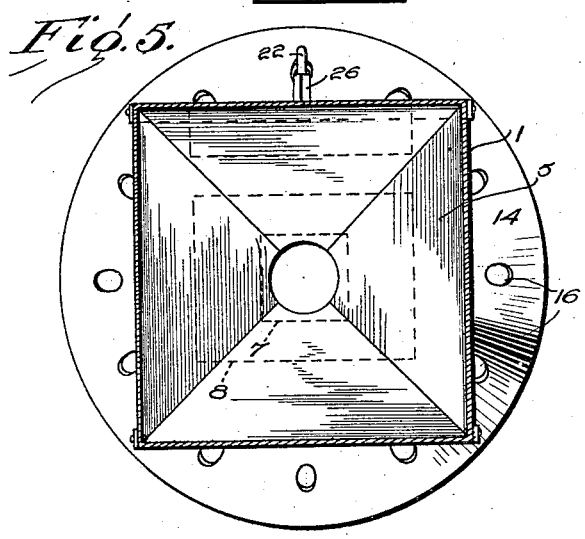
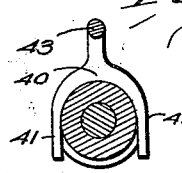
Inventor
GUST WILLMAN
By
C. M. Parker Attorney

UNITED STATES PATENT OFFICE.

GUST WILLMAN, OF FLINT, MICHIGAN.

POULTRY FEEDING DEVICE.

1,409,434. Specification of Letters Patent. Patented Mar. 14, 1922.

Application filed April 11, 1921. Serial No. 460,319.

*To all whom it may concern:*

Be it known that I, GUST WILLMAN, a citizen of the United States, residing at Flint, in the county of Genesee and State of Michigan, have invented certain new and useful Improvements in Poultry-Feeding Devices, of which the following is a specification.

This invention relates to poultry feeding devices, and it comprises a feed tank having an outlet, a revolving drum arranged beneath said outlet, means for regulating the flow of feed from said outlet, a spreader arranged beneath said drum, means for driving said drum, and automatic control means for said driving means.

In the present invention, I have provided a poultry feeding device wherein a suitable quantity of feed may be arranged in a tank, and delivered through a hopper at a predetermined rate of speed for any desired length of time, and the feed automatically cut off at the expiration of the desired time. The tank outlet is provided with controlling means, consisting of depending chains adapted to retard the flow of feed. The chains are mounted on a drum and may be unwound to cut down the supply of feed, as desired.

From the tank outlet, the feed is adapted to pass over a revolving drum which delivers it to a hopper. This drum is driven by a spring motor, or other suitable driving means, and a governor or cut off is provided, comprising a U-shaped member embracing a threaded shaft and engaging the threads. When the motor drives the drum, the threaded shaft is revolved and the U-shaped yoke is fed toward the end of the shaft. When the yoke reaches the end of the shaft, it engages the face of a gear mounted thereon, and serves as a brake to stop the motor.

In the accompanying drawings, I have shown one embodiment of the invention. In this showing:

Figure 2 is a central longitudinal sectional view of a portion of the mechanism, taken at right angles to Figure 1, Figure 3 is a detail view of the U-shaped control member.

Figure 4 is an elevation of a modified type of spreader,

Figure 5 is a horizontal sectional view on line 5—5 of Figure 1, and,

Figure 6 is a detail sectional view on line 6—6 of Figure 2.

Figure 1:
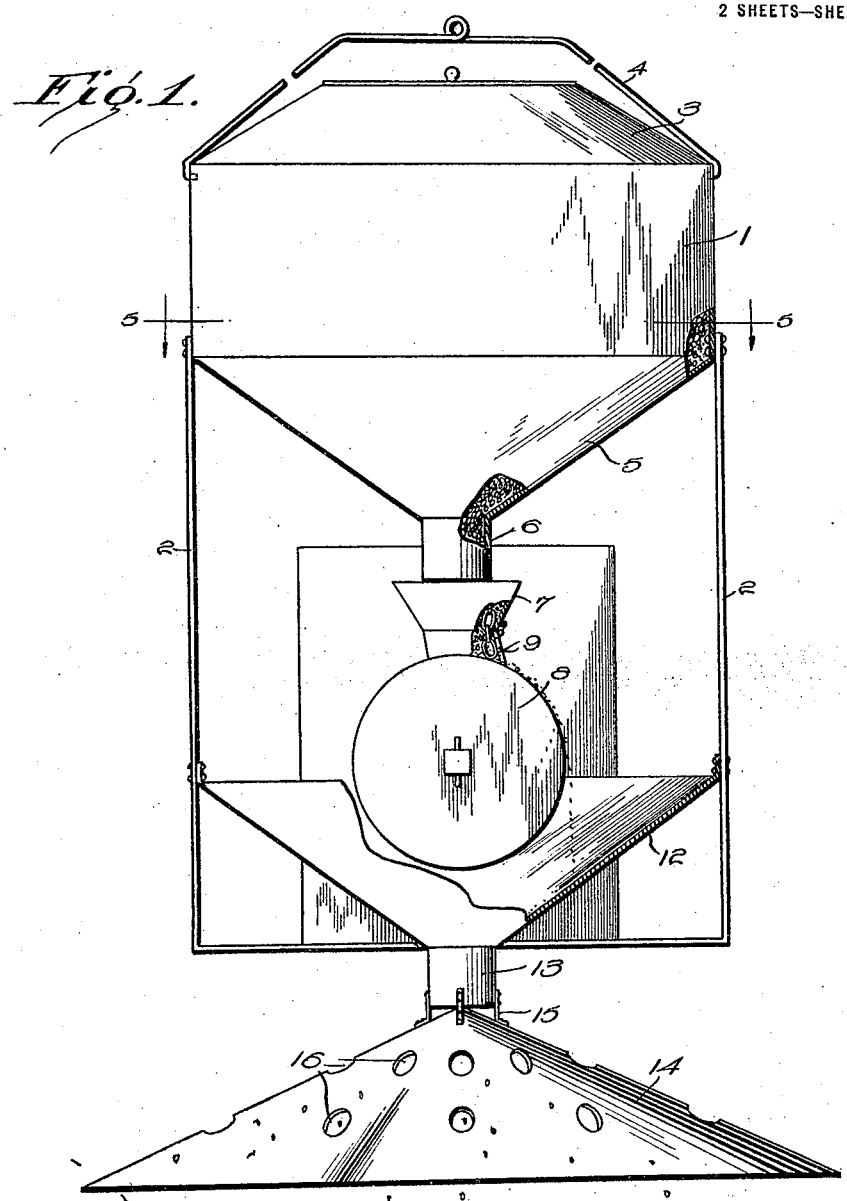
Figure 1 is a front elevation, parts being shown in section.

Referring to the drawings, the reference numeral 1 designates a tank or receptacle which is mounted on suitable supporting members 2, and provided with a removable cover 3, to permit the poultry feed to be placed in the tank. A suitable handle 4 may be provided, if desired. The bottom of the tank is provided with a hopper 5, communicating with an outlet pipe 6. A hopper 7 is arranged beneath the outlet pipe, the bottom of the hopper communicating with the periphery of the drum 8. Suitable regulating means are provided, comprising a plurality of depending chains 9, arranged in the hopper 7, and mounted on a shaft 10. The chains may be raised or lowered by means of a handle 11, provided on the end of the shaft. Beneath the drum 8, a funnel shaped member 12 is provided having an outlet 13. Suitably spaced from the outlet, there is provided a spreader 14, secured thereto by means of brackets 15. As shown, the spreader is substantially cone shaped, and is provided with a plurality of openings 16.

In Figure 4 of the drawings, I have shown a modified form of spreader wherein an inverted V-shaped member having an inlet 17 is adapted to be arranged beneath the outlet 13 of the funnel. The arms 18 of the V-shaped member are hollow, permitting the feed to pass through them to spreaders 19, whereby the feed may be spread in a plurality of different places.

A spring motor, or other suitable drive mechanism 20 is mounted in a casing having side walls 21. The motor is wound by a handle 22, arranged on the motor shaft 23, supported by the walls of the casing. A gear 24 is mounted on this shaft, and meshes with a pinion 25, mounted on a shaft 26, which passes through the drum and revolves it. The shaft 26 carries a gear 27, meshing with a gear 28, on shaft 29. This gear drives a pinion 30, mounted on a shaft 31, which is provided with a gear 32, driving a pinion 33, on the shaft 34. The shaft 34 extends through one of the walls of the casing, and is provided with a gear 35, meshing with a second gear 36, arranged on a shaft 37 positioned behind the shaft 26, and shown in dotted lines in Figure 2 of the drawings. The gear 36 meshes with a gear 38 mounted on a threaded sleeve 39. The threaded sleeve is arranged over the shaft 26, revolving freely thereon and, due to the train of gearing described, operates at a much lower speed than the speed of the shaft. A U-shaped control member 40 having a pair of arms 41 is arranged over the threaded sleeve, the arms being provided with inner faces 42, adapted to engage the threads (see Figure 6). An arm or handle 43 extends from the U-shaped member through the walls of the casing to permit regulation of the U-shaped member.

In operation, the feed is arranged in the tank, and control of the flow is regulated by the chains 9. When the drum is revolving, the agitation of the chains due to the engagement of the lower ends of the chain with the periphery of the drum causes the feed to pass through the hopper 7, over the drum to the funnel shaped member 12, thence to the spreader or spreaders. The sleeve 39 is geared to revolve very slowly, for instance, at the rate of one revolution per hour. When the flow of feed for a desired time is to be regulated, the time regulator or brake 40 is moved inwardly along the threaded shaft over a suitable number of threads. For instance, if the sleeve is arranged to make one revolution per hour, and feed is to be delivered continuously for six hours, the U-shaped member is moved inwardly over six threads on the sleeve 39, and the machine started. As the machine runs, the U-shaped member travels along the threads toward gear 38, and when it reaches the end of the sleeve, it engages the faces of the gear, the friction of such engagement being sufficient to act as a brake and stop the machine.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A poultry feeding device comprising a tank having an outlet, a drum arranged beneath said outlet, a shaft on which said drum is mounted, a source of power connected to said shaft, a second shaft connected to said source of power to revolve it at a slower speed than said first shaft, and a control member mounted on said shaft and adapted to be moved longitudinally thereof by the revolution of the shaft, said control member being adapted to arrest the movement of said shafts when it reaches one end of said second shaft.

2. A poultry feeding device comprising a tank having an outlet, a drum arranged beneath said outlet, a shaft on which said drum is mounted, a source of power connected to said shaft, a second shaft, gearing connecting said second shaft and said source of power to revolve it at a slower speed than said first shaft, and a brake mounted on said shaft and longitudinally movable by the revolution of said shaft, said brake being adapted to engage the gear driving said second shaft to arrest the movement of said shafts.

3. A poultry feeding device comprising a tank having an outlet, a revolving drum arranged beneath said outlet, over which the feed flows, means for regulating the flow of feed, means for revolving said drum, a threaded shaft, said shaft being connected to the means for revolving the drum, and a control member engaging the threads of said shaft, said control member being adapted to frictionally engage a portion of the mechanism at one end of the shaft to stop the revolution of the drum.

4. A poultry feeding device comprising a tank having an outlet, a revolving drum arranged beneath said outlet over which the feed flows, a plurality of depending chains mounted in said outlet and engaging the drum to control the flow of feed, a motor, connections between said motor and said drum to revolve the drum when the motor is running, a threaded shaft driven by said motor, a U-shaped member engaging the threads of said shaft, and means connected to said shaft and revolving therewith adapted to frictionally engage said U-shaped member when it reaches the end of the shaft to stop the motor.

In testimony whereof I affix my signature in presence of two witnesses.

GUST WILLMAN.

Witnesses:
 James J. Grace,
 James E. Adair.